(12) United States Patent
Saarinen (10) Patent No.: US 7,855,865 B2
(45) Date of Patent: Dec. 21, 2010

(54) CIRCUITRY PROTECTION ARRANGEMENT

(75) Inventor: Pertti Saarinen, Salo (FI)

(73) Assignee: Nokia Corporation, Espoo (FI)

( * ) Notice: Subject to any disclaimer, the term of this patent is extended or adjusted under 35 U.S.C. 154(b) by 361 days.

(21) Appl. No.: 11/975,121

(22) Filed: Oct. 16, 2007

(65) Prior Publication Data

US 2009/0097182 A1    Apr. 16, 2009

(51) Int. Cl.
H02H 3/20    (2006.01)
(52) U.S. Cl. .................... 361/91.1; 361/91.6; 361/93.1; 361/111
(58) Field of Classification Search ............... 361/79, 361/91.6, 18, 56, 91.1, 93.1, 103, 111
See application file for complete search history.

(56) References Cited

U.S. PATENT DOCUMENTS

| | | | | |
|---|---|---|---|---|
| 3,684,924 A | * | 8/1972 | Miller, Jr. ..................... | 361/58 |
| 3,968,472 A | * | 7/1976 | Taylor ......................... | 367/135 |
| 4,412,265 A | * | 10/1983 | Buuck ......................... | 361/18 |
| 4,831,484 A | * | 5/1989 | Bruch ......................... | 361/101 |
| 5,014,156 A | * | 5/1991 | Bruch et al. .................. | 361/58 |
| 5,539,299 A | * | 7/1996 | Fernandez et al. ........... | 320/163 |
| 5,625,273 A | * | 4/1997 | Fehling et al. .............. | 320/136 |
| 6,700,766 B2 | * | 3/2004 | Sato .......................... | 361/93.1 |
| 6,829,129 B2 | * | 12/2004 | Marsh et al. ................. | 361/111 |
| 6,914,416 B2 | * | 7/2005 | Thomas et al. .............. | 320/136 |
| 6,947,266 B1 | * | 9/2005 | Billingsley .................. | 361/55 |
| 7,394,223 B2 | * | 7/2008 | Lai et al. ..................... | 320/134 |
| 7,505,241 B2 | * | 3/2009 | McLoughlin et al. ....... | 361/124 |
| 7,508,643 B2 | * | 3/2009 | Shreiner et al. ............. | 361/119 |
| 7,522,419 B2 | * | 4/2009 | Huang et al. ................. | 361/704 |
| 2002/0153991 A1 | * | 10/2002 | Haeusel et al. .............. | 337/404 |
| 2005/0286195 A1 | * | 12/2005 | Francis ........................ | 361/103 |

\* cited by examiner

*Primary Examiner*—Jared J Fureman
*Assistant Examiner*—Christopher J Clark
(74) *Attorney, Agent, or Firm*—Ware, Fressola, Van Der Sluys & Adolphson LLP (57) ABSTRACT

A circuit and a method are provided for protecting sensitive circuitry from over voltage and over current during a double fault situation. The circuit may be used in a portable electronic device, and may include an over voltage protection component and an over current protection component. The over voltage protection component may be coupled across power supply inputs of a load of the portable electronic device. The over current protection component is configured in the circuit to provide over current protection to the load of the portable electronic device at least when the over current protection component provides over current protection to the over voltage protection component.

23 Claims, 6 Drawing Sheets

CIRCUITRY PROTECTION ARRANGEMENT

TECHNICAL FIELD

The present invention relates to protection of key circuitry components of an electronic device from over voltage, and more particularly to protection of key circuitry components during two simultaneous faults.

BACKGROUND OF THE INVENTION

In circuitry that includes sensitive components, for example charging circuitry of an electronic device, protection from over voltage may be provided through the use of a transient voltage suppressor. The transient voltage suppressor generally reduces the amount of voltage provided to sensitive circuitry components by diverting an amount of voltage to ground or away from the sensitive circuitry components. However, in a situation where the transient voltage suppressor has become disabled or disconnected from the circuitry, no protection from over voltage is provided to the sensitive components. This may result in damage to the sensitive components due to the increased amount of current flowing through the sensitive components as a result of the increased voltage. In addition, the increased voltage may also result in other unsafe conditions.

Institute of Electrical and Electronics Engineers (IEEE) 1725 standard provides that charging circuitry, in particular charging circuitry related to mobile telephones, must be safe when there are two simultaneous faults. IEEE 1725 establishes criteria for design analysis for qualification, quality, and reliability of rechargeable lithium ion and lithium polymer batteries for cell phone applications. The purpose of IEEE 1725 is to ensure reliable user experience and operation of cell phone batteries.

For example, the voltage of a charging power source provided to the charging circuitry may suddenly increase due to a spike in voltage of an electrical distribution system. In this instance, the voltage provided to the charging circuitry is too high, and the transient voltage suppressor is needed to direct the over voltage away from the charging circuitry. In certain circumstances the transient voltage suppressor may not be able to direct over voltage away from the charging circuitry. For example, the transient voltage suppressor may heat up due to the increased current passing through it, and become disconnected from the charging circuitry. In this case, the transient voltage suppressor will no longer provide protection to the charging circuitry, possibly leading to damage to the charging circuitry or another unsafe condition. Furthermore, the transient voltage suppressor may have been improperly connected to the charging circuitry during manufacture, or not connected at all.

Therefore, if an over voltage condition exists and the transient voltage suppressor is disabled or disconnected due to the over voltage condition or some other fault condition, the charging circuitry may be damaged. In addition, it is difficult to ensure that over voltage protection components, such as transient voltage suppressors, are operating correctly and properly attached to the charging circuitry. If the over voltage protection component is not operating correctly or attached to the charging circuitry effectively during manufacturing, the over voltage protection component will not even provide protection for a first over voltage fault. Accordingly, what is needed is a mechanism to ensure that circuitry is safe during two simultaneous faults, and to ensure that over voltage protection components are functioning properly after manufacture.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with a first aspect of the present invention a portable device that includes a circuit is provided. The portable device may be a mobile communication device, for example a cellular telephone. The circuit included in the portable device includes a first component, which may be an overvoltage protection component, configured to be coupled across power supply inputs of a load. The power supply inputs may be configured for receipt of power from an external power source, and the first component may be configured to provide over voltage protection for the load. The circuit may also include a second component coupled to the first component and configured to be coupled to the load. The second component may be configured to provide over current protection for the load and for the first component. The second component is configured to provide over current protection to the load at least when the second component provides over current protection to the first component.

In accordance with the first aspect of the invention, the first component may include a transient voltage suppressor.

In accordance with the first aspect of the invention, the first component may include a zener diode.

In accordance with the first aspect of the invention, the power supply inputs may include a first power supply input and a second power supply input that may each be configured to couple the load to the external power source. The second component includes at least one connecting member configured to be positioned in an electrical path between one power supply input of the load and the external power source, and the first connecting member is responsive to an over current event so as to break the electrical path.

In accordance with the first aspect of the invention, the at least one connecting member includes at least one solder ball.

In accordance with the first aspect of the invention, the at least one connecting member is configured to be positioned in a current path between the external power source and the first component during the over current event.

In accordance with the first aspect of the invention, the at least one connecting member is configured to be positioned in a current path between the external power source and the load during the over current event.

In accordance with the first aspect of the invention, second component includes a first connecting member configured to connect the first component to a first power supply input of the power supply inputs and a first current resisting component. The first connecting member is configured to disconnect the first component from the first power supply input during an over current event, and the second component is configured to alter a signal communicated to a control input of the load when the first component is disconnected from the first power supply input.

In accordance with the first aspect of the invention, the signal is an enable signal with a first state configured to enable the load and a second state configured to disable the load, and the second component is configured to alter the state of the enable signal.

In accordance with the first aspect of the invention, the signal is a not-enable signal with a first state configured to disable the load and a second state configured to enable the load, and the second component is configured to alter the state of the not-enable signal.

In accordance with the first aspect of the invention, the second component further includes a second connecting member configured to connect the first component to a second power supply input of the power supply inputs and a second current resisting component. The second connecting member is configured to disconnect the first component from the second power supply input during the over current event if the first connecting member remains connected to the first component during the over current event. The second component is configured to alter a second signal transmitted to a second control input of the load when the first component is disconnected from the second power supply input.

In accordance with the first aspect of the invention, the second signal is an enable signal with a first state configured to enable the load and a second state configured to disable the load, and the second component is configured to alter the state of the enable signal.

In accordance with the first aspect of the invention, the second signal is a not-enable signal with a first state configured to disable the load and a second state configured to enable the load, and the second component is configured to alter the state of the not-enable signal.

In accordance with the first aspect of the invention, the power supply inputs comprise a first power supply input and a second power supply input each configured to couple the load to the external power source. The first power supply input includes a first section and a second section, and the second component includes at least one connecting member configured to connect the first component to the second section and the first section. The first component is coupled to the second power supply input by at least one more connecting member than the first component is connected to the second section and the first section.

In accordance with the first aspect of the invention, the load includes a charger circuit.

In accordance with the first aspect of the invention, the load includes a battery.

In accordance with the first aspect of the invention, the portable device includes a mobile communication device.

In accordance with a second aspect of the invention, a method is provided that includes providing a first component configured to be coupled across power supply inputs of a load of a portable device. The power supply inputs configured for receipt of power from an external power source, and the first component configured to provide over voltage protection for the load. The method further includes coupling a second component to the first component. The second component is configured to be coupled to the load, and configured to provide over current protection for the load and for the first component. The second component is configured to provide over current protection to the load at least when the second component provides over current protection to the first component.

In accordance with the second aspect of the invention, the first component includes a transient voltage suppressor.

In accordance with the second aspect of the invention, the method further includes providing a first power supply input and a second power supply input of the power supply inputs, each configured to couple the load to the external power source. The method further includes providing at least one connecting member of the second component configured to be positioned in an electrical path between one power supply input of the load and the external power source. The first connecting member is responsive to an over current event so as to break the electrical path.

In accordance with the second aspect of the invention, the at least one connecting member includes at least one solder ball.

In accordance with the second aspect of the invention, the method further includes providing a first connecting member of the second component configured to connect the first component to a first power supply input of the power supply inputs and a first current resisting component. The first connecting member is configured to disconnect the first component from the first power supply input during an over current event. The method further includes altering a signal communicated to a control input of the load when the first component is disconnected from the first power supply input.

In accordance with the second aspect of the invention, the signal is an enable signal with a first state configured to enable the load and a second state configured to disable the load, and the second component is configured to alter the state of the enable signal.

In accordance with the second aspect of the invention, the signal is a not-enable signal with a first state configured to disable the load and a second state configured to enable the load, and the second component is configured to alter the state of the not-enable signal.

In accordance with the second aspect of the invention, the method further includes providing a first power supply input and a second power supply input of the power supply inputs, each configured to couple the load to the external power source. The first power supply input includes a first section and a second section, and the second component includes at least one connecting member configured to connect the first component to the second section and the first section. The first component is coupled to the second power supply input by at least one more connecting member than the first component is connected to the second section and the first section.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

Figure 1A:
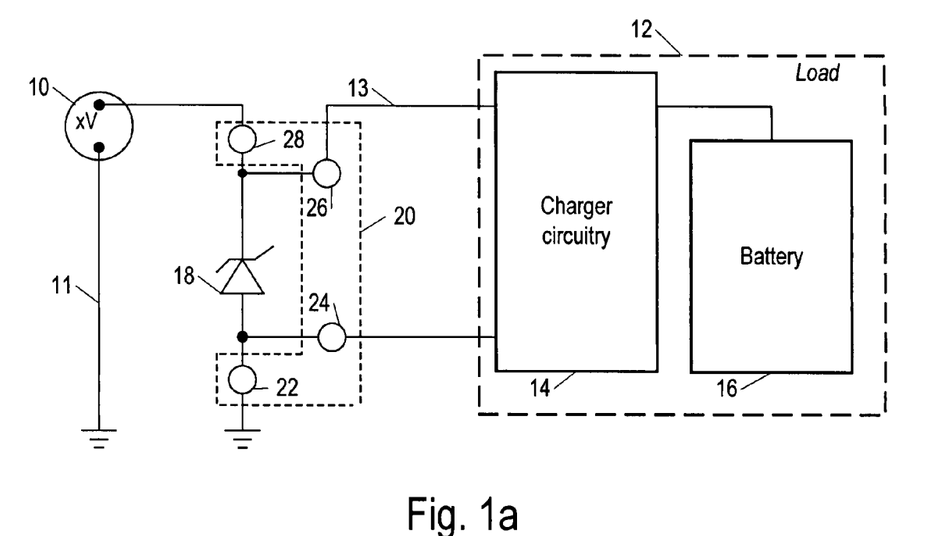
FIGS. 1a-1c show an exemplary circuit for providing dual fault protection according to an embodiment of the present invention.
Figure 1B:
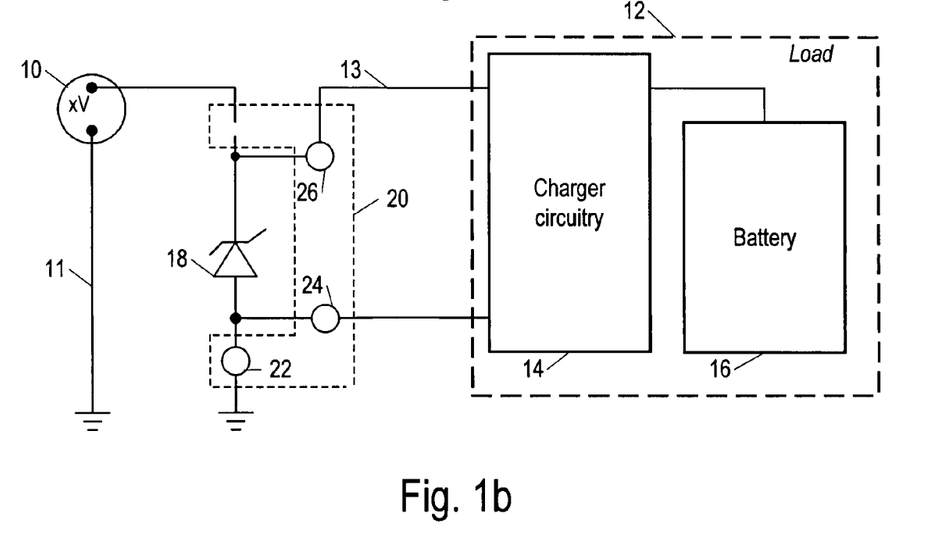
Figure 1C:
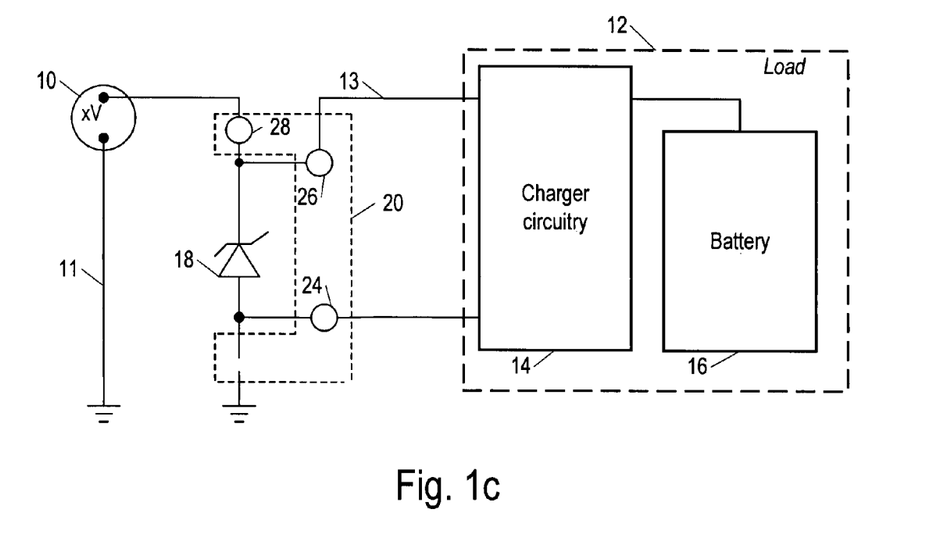

FIGS. 1a-1c show an exemplary embodiment of the invention in which a circuit is provided for coupling a load 12 to a power source 10. The circuit may be included in a portable electronic device, for example a mobile phone, personal data assistant (PDA), laptop computer, or other portable electronic device that contains a rechargeable battery. The circuit shown in FIG. 1a includes a first power supply input 13 coupled between the load 12 and the power source 10, and a second power supply input 11 coupled between the load 12 and the power source 10. The first power supply input 13 includes the positive line running from the power source 10 the load 12, and the second power supply input 11 includes the ground or negative line running from the load 12 to the power source 10. While these lines are referred to as first and second power supply inputs it is understood that these names are merely for reference and are not limiting. The load 12 may include a charger circuitry 14 and a battery 16, but it is understood that the load 12 may be any electrical load as known in the art. The charger circuitry 14 and battery 16 may be those of a portable electronic device. In the exemplary embodiment shown in FIG. 1*a* the load includes charger circuitry 14 coupled to a battery 16, for example a rechargeable battery whose recharging is regulated or controlled by the charger circuitry 14. The power source 10 may be for example a charger that is configured to connect to an electrical distribution system, or it may be a charger that is cable of producing its own electrical output. It is understood that the first power supply input 13 and second power supply input 11 of the load 12 are included in an electrical path between the power source 10 and the load 12.

In accordance with the exemplary embodiment shown in FIG. 1*a*, the circuit may also include a over voltage protection component 18 that is configured to provide over voltage protection for the load 12. The over voltage protection component 18 may be a transient voltage suppressor, for example a zener diode or another equivalent voltage limiter. The over voltage protection component 18 is configured to be coupled across the first power supply input 13 and the second power supply input 11. The over voltage protection component 18 may be configured so that when the power source 10 generates a voltage that is greater than normal for the load 12, the resistance of the over voltage protection component 18 decreases and the over voltage protection component 18 begins to conduct current, thereby reducing the amount of voltage reaching the load 12. It is understood that the voltage at which the over voltage protection component 18 begins to direct current away from the load 12 will be dependent upon the application in which the over voltage protection component 18 is used. The present invention is not limited to any particular voltage or range of voltages at which the over voltage protection component will begin to conduct current away from the load 12.

The circuit shown in FIG. 1*a* may also include a current protection component 20. As shown in FIG. 1*a*, the current protection component 20 may include solder balls 22, 24, 26, 28 that connect the over voltage protection component 18 to the first power supply input 13 and the second power supply input 11. The solder balls 26, 28 on the first power supply input 13 also connect the sections of the first power supply input 13 to each other. The solder balls 22, 24 on the second power supply input also connect the sections of the second power supply input 11 to each other. While two solder balls are shown connecting the sections of the first power supply input 13 to each other, it is understood that one solder ball may be used. In addition, one solder ball may also be used to connect the sections of the second power supply input 11 to each other as well. Therefore, as shown in FIG. 1*b*, when a solder ball is missing the circuit is no longer complete, and no electricity may flow through the circuit. In this manner, both the over voltage protection component 18 and the load 12 are protected from over current by the current protection component 20.

The embodiments of the invention as shown in FIGS. 1*a*-1*c* operate as follows. As current passes through the over voltage protection component 18 heat may be generated. The current and resulting heat may result in failure of the over voltage protection component 18, either due to breakdown of the over voltage protection component 18 or disconnection between the over voltage protection component and the first power supply input 13 or second power supply input 11. However, as shown in FIGS. 1*b* and 1*c* the current protection component 20 is configured to prevent further electrical flow to occur when the over voltage protection component 18 has become disconnected from the power supply inputs 11, 13. The over voltage protection component 18 may be disconnected from the power supply inputs 11, 13 during an over current event due to the heat build up causing any one of the solder balls 22, 24, 26, 28 of the second component to melt. The melting of the solder balls 22, 24, 26, 28 disconnects the over voltage protection component 18 from a section of the circuit causing a break in the electrical path of the circuit.

As shown in FIG. 1*b*, a solder ball has melted and as a result the circuit is incomplete. Therefore, no current can flow from the power source 10, and the load 12 is protected from damage. FIG. 1*c* shows another exemplary situation in which a different solder ball has melted, and as a result the circuit is incomplete. Due to discontinuities in the first power supply input 13 and second power supply input 11, the circuit is only complete when all four solder balls of the current protection component 20 are present, otherwise the circuit is incomplete and no current can flow from the power source 10 to the load 12. It is also possible that the circuit shown in FIGS. 1*b* and 1*c* can provide preemptive protection to the load, in the sense that if any of the solder balls 22, 24, 26, 28 are missing or not soldered properly, no current can flow from the power source 10 to the load 12 regardless of whether an over voltage situation has occurred. In this manner, current protection component 20 also protects both the load 12 and the over current protection component 18 by ensuring that current cannot pass through the circuit when the over current protection component 18 will be unable to provide over current protection due because it is missing or improperly connected.

Figure 2A:
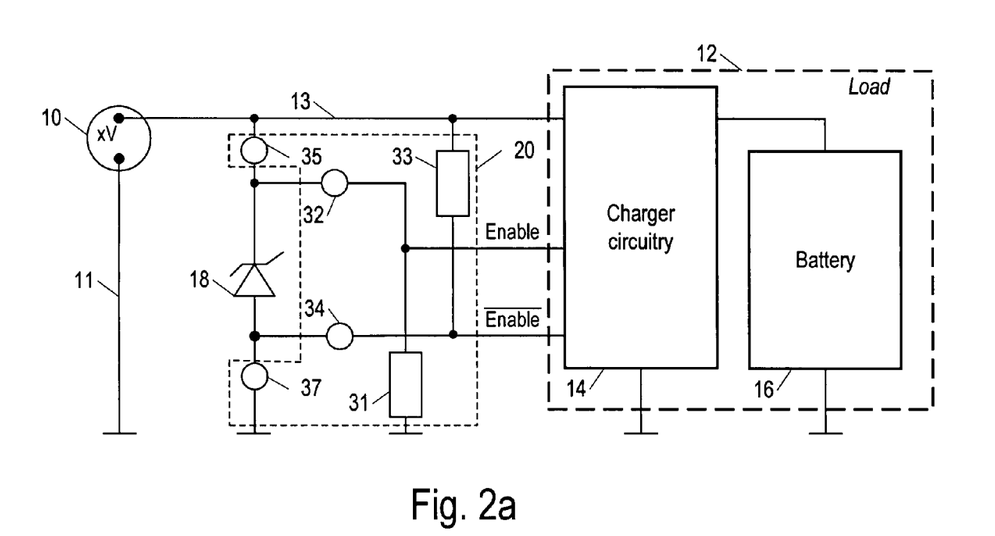
FIGS. 2a-2c show an exemplary circuit for providing dual fault protection according to an embodiment of the present invention.
Figure 2B:
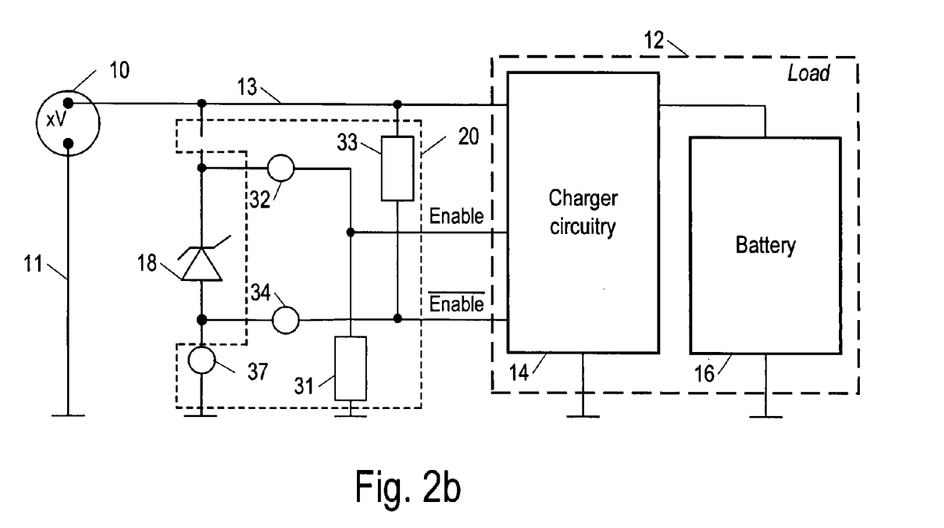
Figure 2C:
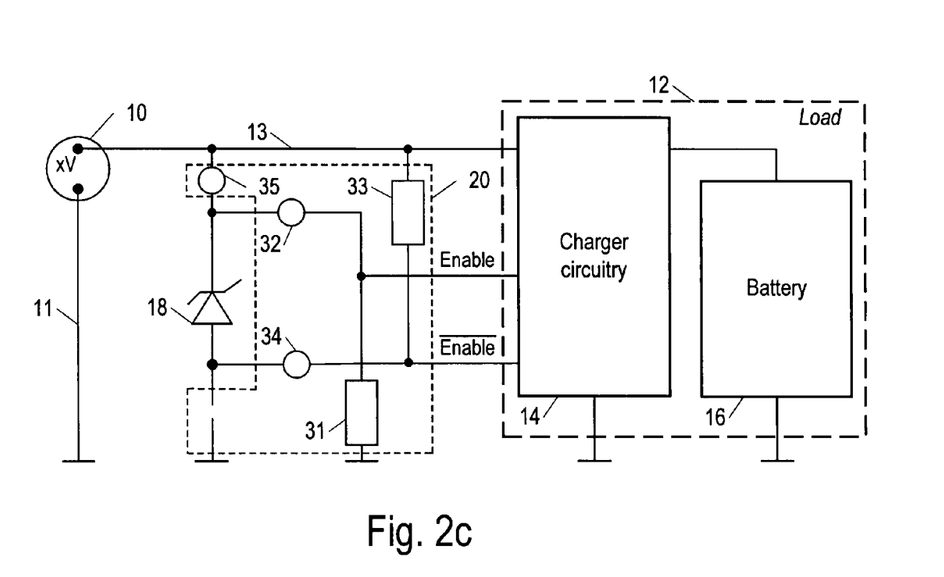

FIGS. 2*a*-2*c* show another exemplary embodiment of the circuit according to the present invention. The circuit shown in FIGS. 2*a*-2*c* contains the same components as the circuit shown in FIGS. 1*a*-1*c*, as indicated by like reference numerals. In the embodiment shown in FIG. 2*a* the current protection component 20 also includes two current resisting components 31, 33 that may be for example resistors. In the exemplary embodiment shown in FIG. 2*a*, the first power supply input 13 and second power supply input 11 are not discontinuous as shown in FIGS. 1*a*-1*c*, instead they form a complete circuit with the power supply 10 and load 12. In addition to the current resisting components 31, 33, the current protection component 20 in this embodiment of the invention also includes at least two solder balls 35, 37, but may also include solder balls 32, 34 as well. As discussed above, when the voltage provided by the power source 10 is greater than normal for the load 12, which will be dependent upon the load 12 and the type of application the load 12 is used for, the over voltage protection component 18 will decrease in resistance and draw current away from the load 12 to ground. In the event that the heat generated by the excess current flowing through the over voltage protection component 18 melts one of the solder balls 35, 37, the current protection component 20 is configured to disable the charger circuitry 14 so that the circuit no longer demands electricity from the power source 10.

The current protection component 20 may be configured to sense the change in voltage that occurs when either solder ball 35, 37 or solder balls 32, 34 has been melted and the over voltage protection component 18 is disconnected from part of the circuit. When the current protection component 20 senses a change in a voltage it may alter the state an enable or not-enable signal communicated to a control input (not shown) of the charger circuitry 14. The enable and inverted not-enable signals may be combined through AND logic, and therefore a change in a state for either signal will result in shutting down of the charger circuitry 14 so that the load 12 no longer demands power from the power source 10. In this manner, when the over voltage protection component 18 is no longer capable of providing over voltage protection to the load 12, the flow of electricity is prevented so that the load 12 is not damaged and an unsafe condition is avoided.

Figure 3A:
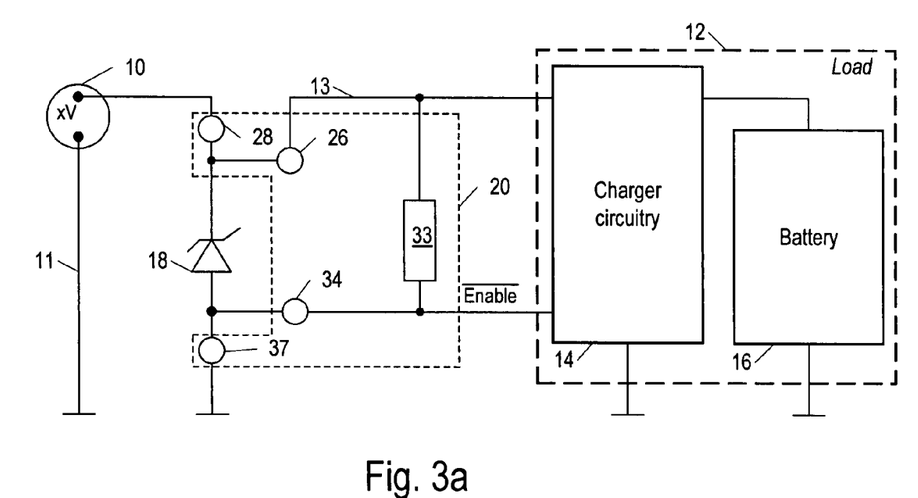
FIGS. 3a-3c show an exemplary circuit for providing dual fault protection according to an embodiment of the present invention.
Figure 3B:
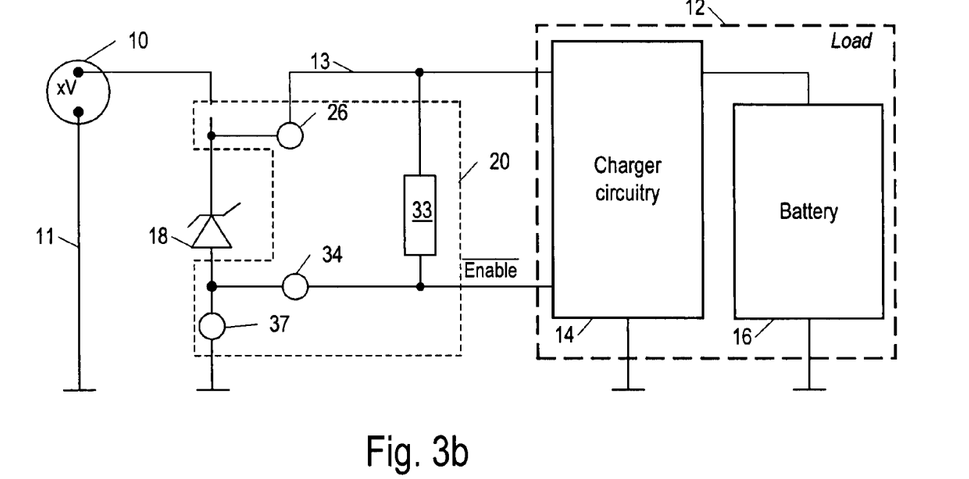
Figure 3C:
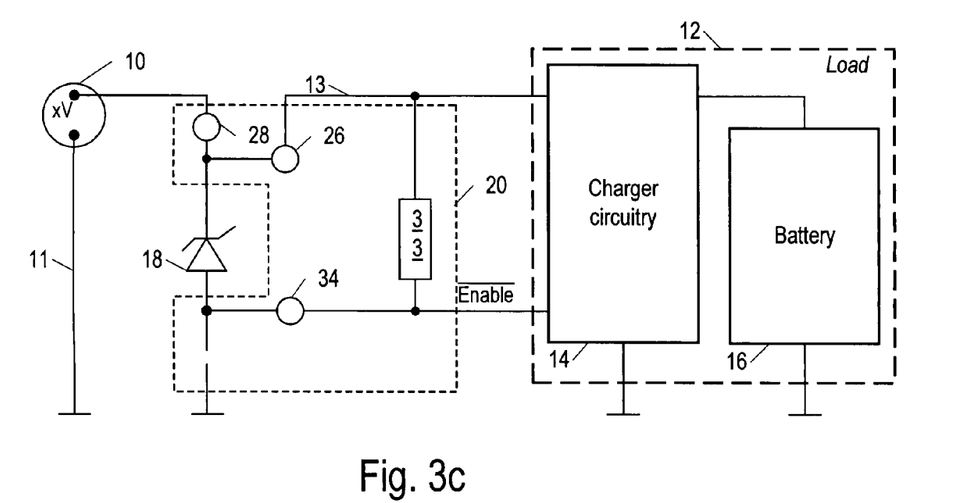

Another exemplary embodiment of the invention is shown in FIGS. 3a-3c. The embodiment of the circuit according to the invention shown in FIGS. 3a-3c includes similar components to the embodiments as shown in FIGS. 1a-1c and 2a-2c, as indicated by like reference numerals. The current protection component 20 shown in FIG. 3a includes solder balls 26, 28, 37, as well as current resisting component 33. The current protection component 20 may also include solder ball 34. The current protection component 20 is configured to provide current protection to the load 12 and the over voltage protection component 18 in the event that the over voltage protection component becomes disconnected from the circuit due to melting of one of the solder balls 26, 28, 37. The current protection component 20 provides current protection to the over voltage protection component 18 by disconnecting the over voltage protection component 18 from the circuit, which has the effect of also protecting the load 12 due to the configuration of the circuit.

In the event that solder balls 26 or 28 melt, the first power supply input 13 is discontinuous as shown in FIG. 3b, and current flow through the circuit is prevented since the circuit is no longer completed. In the event that solder ball 37 melts as shown in FIG. 3c by the absence of solder ball 37, the current protection component 20 is configured to sense the change in voltage and alter the state an enable or not-enable signal provided to a control input of the charger circuitry. The enable or not-enable signal will cause the charger circuitry 14 to be disabled, and thereby stopping the demand for power from the power source 10. In this case, no more current will flow into the circuit, because there is no demand for the electricity. The circuit shown in FIGS. 3a-3c will also protect the load 12 and over voltage protection component 20 from over current if any of the solder balls 26, 28, 34 or 37 are disconnected or improperly connected during manufacturing of the circuit. In this instance, no current will be able to flow to the load 12 from the circuit.

Figure 4A:
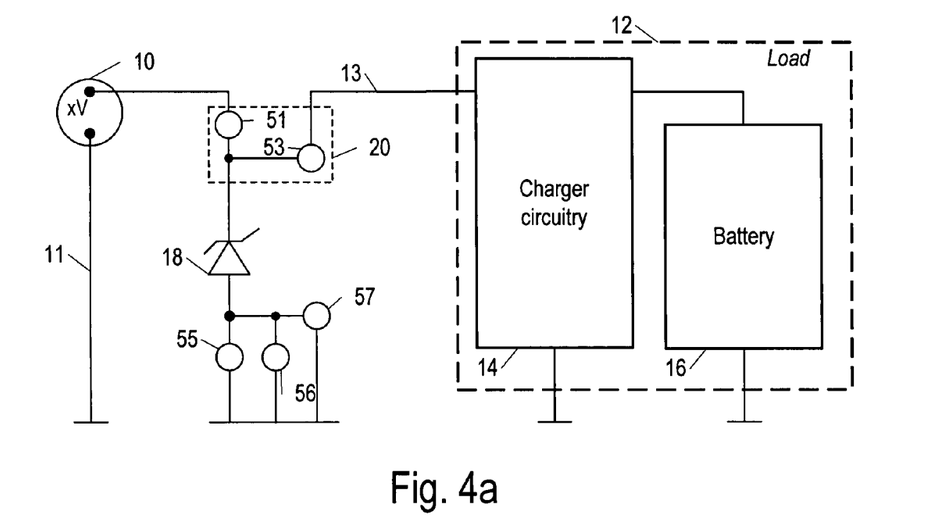
FIGS. 4a-4c show an exemplary circuit for providing dual fault protection according to an embodiment of the present invention.
Figure 4B:
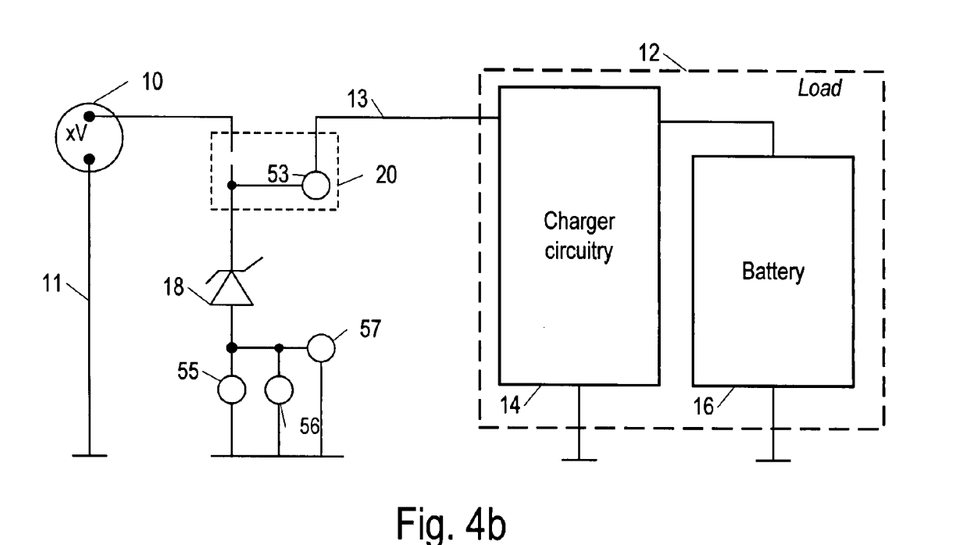
Figure 4C:
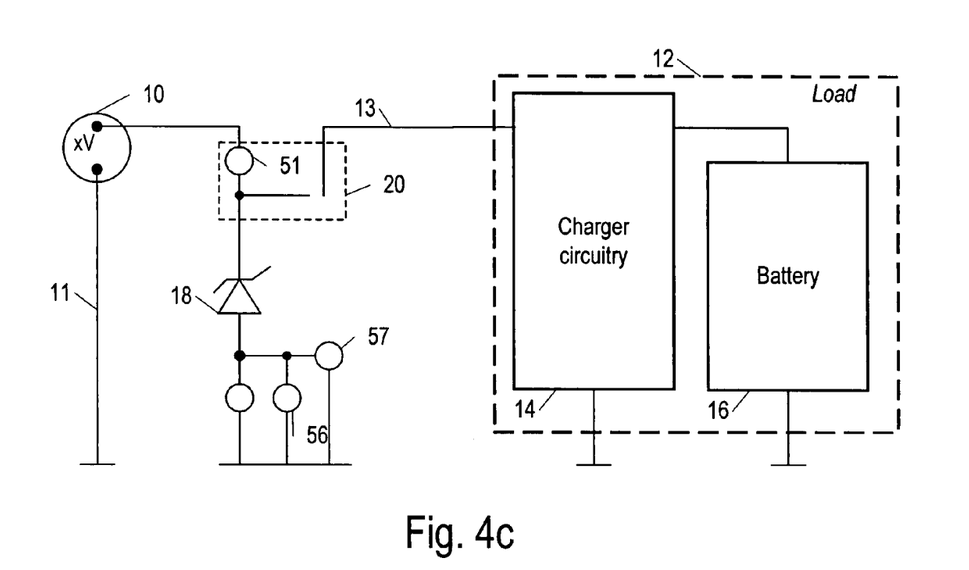

FIGS. 4a-4c show another exemplary embodiment of the circuit according to the present invention. As shown in FIGS. 4a-4c the circuit includes components similar to the circuits shown in FIGS. 1a-1c, 2a-2c and 3a-3c, as shown by like reference numerals. In the circuit shown in FIG. 4a the current protection component includes solder balls 51, 53 connecting the over voltage protection component 18 to the first power supply input 13. As discussed previously, since the first power supply input 13 is discontinuous, if the solder balls 51, 53 melt the circuit will become incomplete. In order to increase the likelihood that solder balls 51, 53 on the first power supply input 13 melt the over voltage protection component 18 is connected to the second power supply input 11, i.e. the ground line by at least one more solder ball 55, 56, 57 than is used to connect the over voltage protection component 18 to the first power supply input 13. For example, in FIGS. 4a-4c the over voltage protection component 18 is connected to the first power supply input 13 by two solder balls, and connected to the second power supply input 13 by three solder balls. In this manner, the connection to the ground line will have greater conducting area and better heat resistive properties, thereby decreasing the likelihood that the solder balls 55, 56, 57 on the second power supply input 11 will melt.

The present invention may also be embodied in a method in which the method includes providing a first component configured to be coupled across power supply inputs of a load of a portable device. The first component may be an over voltage protection component such as a transient voltage suppressor. In this exemplary embodiment of the invention, the power supply inputs are configured for receipt of power from an external power source, and the first component is configured to provide over voltage protection for the load. The method further includes coupling a second component to the first component. The second component is configured to provide over current protection for the load and for the first component. The second component is configured to provide over current protection to the load at least when the second component provides over current protection to the first component.

The method according to this exemplary embodiment of the invention may also include providing a first power supply input and a second power supply input of the power supply inputs, each configured to couple the load to the external power source. The method further includes providing at least one connecting member of the second component configured to be positioned in an electrical path between one power supply input of the load and the external power source. The first connecting member is responsive to an over current event so as to break the electrical path.

In another exemplary embodiment of the invention, a method is provided that includes providing a first connecting member of the second component configured to connect the first component to a first power supply input of the power supply inputs and a first current resisting component. The first connecting member is configured to disconnect the first component from the first power supply input during an over current event. The method further includes altering a signal communicated to a control input of the load when the first component is disconnected from the first power supply input. The signal may be an enable signal with a first state configured to enable the load and a second state configured to disable the load, and the second component is configured to alter the state of the enable signal. In the alternative, the signal may be a not-enable signal with a first state configured to disable the load and a second state configured to enable the load, and the second component is configured to alter the state of the not-enable signal.

It is to be understood that the above-described arrangements are only illustrative of the application of the principles of the present invention. Numerous modifications and alternative arrangements may be devised by those skilled in the art without departing from the scope of the present invention.

What is claimed is:

1. A portable device comprising a circuit, wherein the circuit comprises:
 a first component configured to be coupled across power supply inputs of a load, said power supply inputs configured for receipt of power from an external power source, said first component configured to provide over voltage protection for said load; and
 a second component coupled to the first component and configured to be coupled to said load, said second component configured to provide over current protection for said load and for said first component, wherein said second component provides over current protection to said load at least when the second component provides over current protection to said first component;

wherein said second component comprises a first connecting member configured to connect said first component to a first power supply input of said power supply inputs and a first current resisting component;

wherein said first connecting member is configured to disconnect said first component from said first power supply input during an over current event;

wherein said second component further comprises a second connecting member configured to connect said first component to a second power supply input of said power supply inputs and a second current resisting component; and wherein said second connecting member is configured to disconnect said first component from said second power supply input during said over current event if said first connecting member remains connected to said first component and said first power supply input during said over current event; and wherein said second component is configured to alter a signal communicated to a control input of said load when said first component is disconnected from said first power supply input.

2. The portable device according to claim 1, wherein the first component comprises a transient voltage suppressor.

3. The portable device according to claim 1, wherein the first component comprises a zener diode.

4. The portable device according to claim 1, wherein the first power supply input and the second power supply input are each configured to couple the load to said external power source;

wherein the first connecting member is configured to be positioned in an electrical path between one power supply input of said load and said external power source; and wherein said first connecting member is responsive to an over current event so as to break said electrical path.

5. The portable device according to claim 4, wherein the first connecting member comprises at least one solder ball.

6. The portable device according to claim 4, wherein the first connecting member is positioned in a current path between said external power source and said first component during said over current event.

7. The portable device according to claim 4, wherein the second connecting member is positioned in a current path between said external power source and said load during said over current event.

8. The portable device according to claim 1, wherein said signal is an enable signal comprising a first state configured to enable said load and a second state configured to disable said load, and said second component is configured to alter said enable signal.

9. The portable device according to claim 1, wherein said signal is a not-enable signal comprising a first state configured to disable said load and a second state configured to enable said load, and said second component is configured to alter said not-enable signal.

10. The portable device according to claim 1, wherein said second component is configured to alter a second signal transmitted to a second control input of said load when said first component is disconnected from said second power supply input.

11. The portable device according to claim 10, wherein said second signal is an enable signal comprising a first state configured to enable said load and a second state configured to disable said load, and said second component is configured to alter said enable signal.

12. The portable device according to claim 10, wherein said second signal is a not-enable signal comprising a first state configured to disable said load and a second state configured to enable said load, and said second component is configured to alter said not-enable signal.

13. The portable device according to claim 1, wherein said first power supply input comprises a first section and a second section;

wherein said second component comprises a third connecting member configured to connect said first component to said second section and said first section; and wherein said first component is coupled to said second power supply input by at least one more connecting member than the first component is connected to said second section and said first section.

14. The portable device according to claim 1, wherein said load comprises a charger circuit.

15. The portable device according to claim 1, wherein said load comprises a battery.

16. The portable device according to claim 1, wherein said portable device comprises a mobile communication device.

17. A method, comprising:

providing a first component configured to be coupled across power supply inputs of a load of a portable device, said power supply inputs configured for receipt of power from an external power source, said first component configured to provide over voltage protection for said load, and coupling a second component to the first component, wherein the second component is configured to be coupled to said load, and configured to provide over current protection for said load and for said first component, wherein said second component provides over current protection to said load at least when the second component provides over current protection to said first component, providing a first connecting member of said second component configured to connect said first component to a first power supply input of said power supply inputs and a first current resisting component, providing a second connecting member configured to connect said first component to a second power supply input of said power supply inputs and a second current resisting component, wherein said first connecting member is configured to disconnect said first component from said first power supply input during an over current event; and said method further comprises altering a signal communicated to a control input of said load when said first component is disconnected from said first power supply input, and wherein said second connecting member is configured to disconnect said first component from said second power supply input during said over current event if said first connecting member remains connected to said first component and said first power supply input during said over current event.

18. The method according to claim 17, wherein the first component comprises a transient voltage suppressor.

19. The method according to claim 17, wherein the first power supply input and the second power supply input of said power supply inputs, are each configured to couple the load to said external power source, wherein the first connecting member of said second component configured to be positioned in an electrical path between one power supply input of said load and said external power source, and wherein said first connecting member is responsive to an over current event so as to break said electrical path.

20. The method according to claim 19, wherein said first connecting member comprises at least one solder ball.

21. The method according to claim 17, wherein said signal is an enable signal comprising a first state configured to enable said load and a second state configured to disable said load, and said second component is configured to alter said enable signal.

22. The method according to claim 17, wherein said signal is a not-enable signal comprising a first state configured to disable said load and a second state configured to enable said load, and said second component is configured to alter said not-enable signal.

23. The method according to claim 17, wherein said first power supply input comprises a first section and a second section;

wherein said second component comprises a third connecting member configured to connect said first component to said second section and said first section; and wherein said first component is coupled to said second power supply input by at least one more connecting member than the first component is connected to said second section and said first section.

* * * * *